US009933834B2

(12) United States Patent
Mishra et al.

(10) Patent No.: US 9,933,834 B2
(45) Date of Patent: Apr. 3, 2018

(54) CLOCK-FREE DUAL-DATA-RATE LINK WITH BUILT-IN FLOW CONTROL

(71) Applicant: QUALCOMM Incorporated, San Diego, CA (US)

(72) Inventors: Lalan Jee Mishra, San Diego, CA (US); Richard Dominic Wietfeldt, San Diego, CA (US); James Lionel Panian, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 245 days.

(21) Appl. No.: 14/864,586

(22) Filed: Sep. 24, 2015

(65) Prior Publication Data

US 2016/0098073 A1  Apr. 7, 2016

Related U.S. Application Data (60) Provisional application No. 62/059,798, filed on Oct. 3, 2014.

(51) Int. Cl.
  *G06F 1/26* (2006.01)
  *G06F 1/32* (2006.01)
  *G06F 13/42* (2006.01)

(52) U.S. Cl.
  CPC .......... *G06F 1/3234* (2013.01); *G06F 1/3243* (2013.01); *G06F 13/4286* (2013.01); *G06F 13/4295* (2013.01)

(58) Field of Classification Search
  None
  See application file for complete search history.

(56) References Cited

U.S. PATENT DOCUMENTS

| | | | |
|---|---|---|---|
| 5,210,846 A | 5/1993 | Lee et al. | |
| 7,111,097 B2 * | 9/2006 | Lin | G06F 13/4282 710/105 |
| 7,127,538 B1 * | 10/2006 | Nekl | G06F 13/4286 370/463 |
| 7,260,660 B1 | 8/2007 | Nekl | |
| 7,769,932 B2 | 8/2010 | Nichols | |
| 9,063,751 B2 | 6/2015 | Grewal et al. | |
| 2003/0065848 A1 | 4/2003 | Mori | |
| 2012/0027104 A1 * | 2/2012 | Bas | G06F 13/4295 375/253 |
| 2012/0131242 A1 | 5/2012 | Belleville | |
| 2014/0184523 A1 | 7/2014 | McCall et al. | |
| 2015/0002408 A1 | 1/2015 | Mozak et al. | |

OTHER PUBLICATIONS

International Search Report—PCT/US2015/052351—ISA/EPO—dated Dec. 11, 2015.

* cited by examiner

*Primary Examiner* — Nitin Patel
(74) *Attorney, Agent, or Firm* — Haynes and Boone, LLP (57) ABSTRACT

A dual-data-rate interface is provided that includes a transmitter driving a transmit pin coupled to a receive pin of a receiver. The receiver drives its receive pin with cycles of a fetch clock. The transmitter responds to each edge of the fetch clock by transmitting a bit over the transmit pin to the receiver.

22 Claims, 6 Drawing Sheets

CLOCK-FREE DUAL-DATA-RATE LINK WITH BUILT-IN FLOW CONTROL

CROSS-REFERENCE TO RELATED APPLICATIONS

This application claims the benefit of U.S. Provisional Application No. 62/059,798, filed Oct. 3, 2014, the contents of which are hereby incorporated by reference in their entirety.

TECHNICAL FIELD

This application relates to data communication, and more particularly to dual-data-rate communication with built-in flow control.

BACKGROUND

Conventional microprocessors typically include a Universal Asynchronous Receiver/Transmitter (UART) interface for communicating with other entities. A UART interface requires a transmit pin (TX), a receive pin (RX), a Request to Send (RTS) pin, and a Clear to Send (CTS) pin. The UART interface uses an oversampling clock that is 16 times the bit rate. So each received bit is represented by sixteen samples. The UART transmission is very straightforward: to send a binary one, a transmitting UART interface drives its TX pin to the power supply voltage VDD for the duration of the bit period as determined by sixteen cycles of its oversampling clock. The receiving UART interface counts its bit period using its own oversampling clock. Transmission of a binary zero is just the complement: the transmitting UART interface grounds its transmit pin for the duration of the bit period as determined by its oversampling clock cycling the appropriate number of times. The UART interface uses a Request to Send (RTS) pin and a Clear to Send (CTS) pin for flow control. In particular, a receiving UART interface indicates that it is ready to receive data by asserting its RTS pin to a power supply voltage VDD that is received at the transmitting UART interface on its CTS pin. So a transmitting UART interface only transmits when it sees the voltage on it CTS pin being asserted. The resulting data transmission is in frames of eight bits.

Although UART interfaces are simple and relatively robust, its over-sampling clock consumes substantial power as it must oscillate regardless of whether the UART interface is transmitting or receiving data. In addition, UART's frame size is fixed at eight bits. If the frame size is increased, the timing requirements on the oversampling clock (with regard to keeping the transmitter's clock sufficiently aligned with the receiver's clock) become more and more stringent. Accordingly, there is a need in the art for a low-power synchronous data interface that accommodates flexible frame lengths without the use of an oversampling clock.

SUMMARY

A dual-data-rate interface is provided that obviates the need for an oversampling clock. As transmitted by the interface, a frame begins with an initial flag symbol in which a transmitter pulls its transmit pin low to ground and releases it, whereupon the transmit pin is weakly pulled back to a power supply voltage VDD. The transmit pin couples through a transmission line (a bus) such as a circuit board trace to a receiving pin on a receiver. In response, the receiver discharges its receive pin low to ground indicate it is ready to receive the first bit of a frame. The transmitter then transmits the bit and releases the bus to its previous low state. For each subsequent bit, the receiver transitions the bus into a complement binary state as used by the receiver to trigger the transmission of the preceding bit. The receiver thus drives the bus high to the power supply voltage VDD to trigger the transmission of a current bit if the receiver had triggered a transmission of the previous bit in the frame by discharging the bus. Conversely, if the receiver had triggered a transmission of the previous bit in the frame by driving the bus to the power supply voltage VDD, the receiver triggers the transmission of the current bit in the frame by discharging the bus to ground, Each bus transition by the receiver may thus be deemed to comprise either a rising edge of a receiver fetch clock (if receiver transitions the bus high to the power supply voltage) or a falling edge of the receiver fetch clock (if the receiver transitions the bus low to ground). The transmitter only transmits the current bit of the frame responsive to a receiver fetch clock edge transition. In this fashion, flow-control is "built-in" to the single wire bus between a transmitter's transmit pin and a corresponding receive pin on a receiver.

BRIEF DESCRIPTION OF THE DRAWINGS

Aspects of the present disclosure and their advantages are best understood by referring to the detailed description that follows. It should be appreciated that like reference numerals are used to identify like elements illustrated in one or more of the figures.

DETAILED DESCRIPTION

Figure 1:
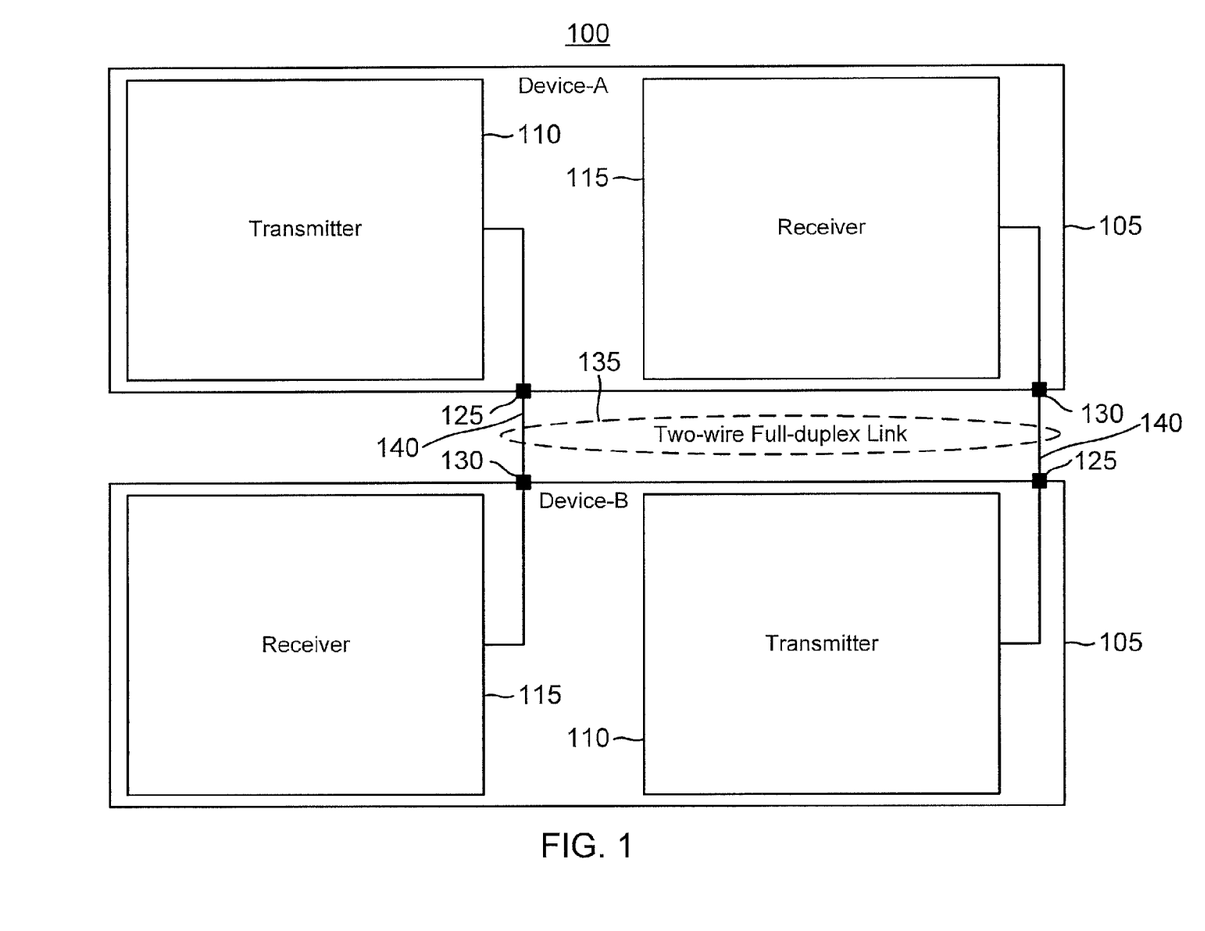
FIG. 1 is block diagram of a system including a pair of integrated circuits each having a dual-data-rate interface as disclosed herein.

An integrated circuit asynchronous dual-data-rate data interface is provided that does not require an oversampling clock. The interface includes a transmitter for sending data over a first pin and also a receiver for receiving data over a second pin. Because of the built-in flow control, the interface needs no additional pins such as the RTS and CTS pins used by conventional UART interfaces. These interfaces may be within a single integrated circuit or within separate integrated circuits. Turning now to the drawings, an example system 100 is shown in FIG. 1. An integrated circuit (Device-A) includes a dual-data-rate interface 105. Similarly, another integrated circuit (Device-B) includes a corresponding dual-data-rate interface 105. Each interface 105 includes a transmitter 110 that transmits through a transmit pin 125 and a receiver 115 that receives through a receive pin 130. A two-wire full-duplex link 135 couples transmit pin 125 of each of the interfaces to receive pin 130 of the remaining one of the interfaces. As used herein, "pin" is a generic term to cover the structure such as a pad or an actual pin that an integrated circuit uses to couple to leads on circuit board or other suitable transmission lines. In link 135, a wire or trace 140 couples between transmit pin 125 for device A to receive pin 130 for device B. Similarly, link 135 includes another wire or trace 140 to couple between transmit pin 125 for device B to receive pin 130 for device B. Each wire 140 may also be denoted as a bus 140.

Figure 2A:
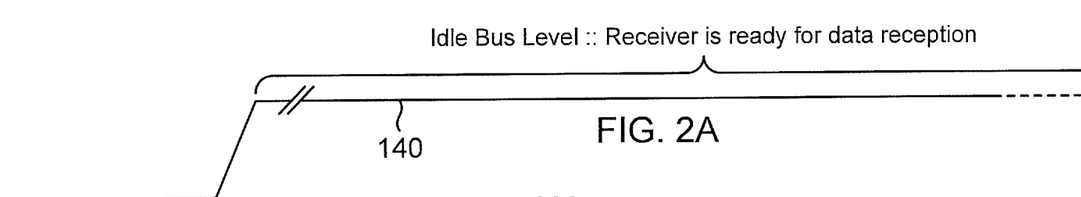
FIG. 2A is a timing diagram for the default bus state for each transmitter in the system of FIG. 1.
Figure 2B:
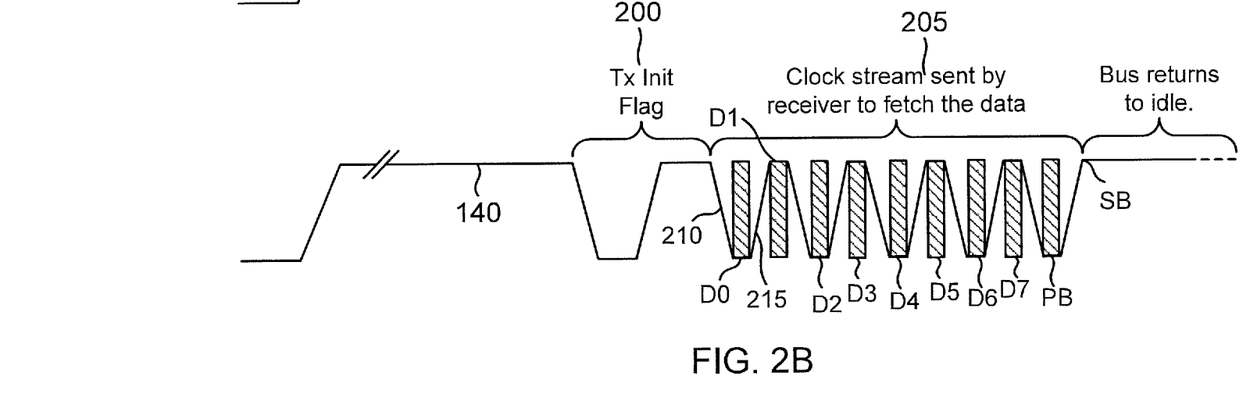
FIG. 2B is a timing diagram for the bus of FIG. 2A during a frame transmission.

To provide the embedded flow control using just two-wire link 135, each transmitter 110 only transmits responsive to a fetch clock from the corresponding receiver 115. The ready state or idle bus state of each wire in two-wire link 135 is logic high (having a power supply voltage VDD) as shown in FIG. 2A. This idle state signals that receiver 115 of FIG. 1 is ready to receive a frame of data. To begin a frame transmission, transmitter 110 of FIG. 1 discharges bus 140 coupled to its transmit pin 125 low to ground as shown in FIG. 2B and then returns bus 140 to its default high state over an initial flag period 200. The duration of initial flag period 200 may be agreed upon in advance by receiver 115 and transmitter 110. For example, each receiver 115 and transmitter 110 may include a configuration memory (not illustrated) that stores various parameters such as the duration of initial flag period 200. Transmitter 110 may then proceed to transmit bits of the ensuing frame pursuant to receiver 115 driving bus 140 with edges of a fetch clock 205 also shown in FIG. 2B. Like the duration of initial flag period 200, the frame size is agreed upon in advance by each transmitter 110 and corresponding receiver 115 such as through configuration of a corresponding configuration memory (not illustrated). For fetch clock 205 of FIG. 2B, the frame size is 8 bits (data bits D0 through D7) followed by a parity bit (PB) and a stop bit (SB). Since the default state of bus 140 is logic high, receiver 115 transmits the a first falling edge 210 of fetch clock 205 by pulling bus 140 low. In response to this first falling edge 210 of fetch clock 205, transmitter 110 sends initial bit D0, which may be either a logic high or logic low signal depending upon its data value. Initial bit D0 (like the remaining bits) is thus illustrated as a cross-hatched column since it may either be logic low or logic high depending upon its binary value. Upon the conclusion of initial bit D0, transmitter 110 returns bus 140 to the binary state established by the preceding clock edge 210, which in this example is logic low (discharged to ground).

Each subsequent fetch clock edge is the binary complement of the preceding fetch clock edge. For example, since initial fetch clock edge 210 is a falling edge, a subsequent fetch clock edge 215 is a rising edge. In response, transmitter 110 transmits data bit D1 and returns bus 140 to the logic high (the power supply voltage VDD) state established by rising clock edge 215. In this fashion, receiver 115 signals that it is ready for each subsequent bit in the frame by transmitting a rising edge for fetch clock 205 if the preceding edge was a falling edge. Conversely, receiver 110 signals that it is ready for each subsequent bit in the frame by transmitting a falling edge for fetch clock 205 is the preceding edge was a rising edge. For each data bit transmission, transmitter 110 ends the transmission by returning bus 140 to its original state as determined by the previous fetch clock edge. Since initial bit D0 is responsive to a falling edge 210, transmitter 110 resets bus 140 back to ground after initial bit D0 is transmitted. Similarly, transmitter 110 resets bus 140 to the power supply voltage VDD after bit D1 is transmitted since bit D1 is responsive to a rising edge 215 of fetch clock 205.

After each bit transmission, receiver 115 indicates it is ready to receive a subsequent bit by transmitting the appropriate fetch clock edge over bus 140. In this fashion, receiver 115 keeps changing the state of bus 140 to indicate it is ready for the next bit. Transmitter 110 then transmits the corresponding bit and returns bus 140 to the state that was set by receiver 115 to initiate the current bit transmission. The number of times receiver 115 will either cycle bus 140 high or low depends upon the number of bits in the frame—the frame size being known in advance to both transmitter 110 and receiver 115. In FIG. 2B, the frame size is eight bits so receiver 115 cycles bus 140 low and high four times (eight binary transitions of the bus). Each bit is transmitted only when receiver 115 transitions bus 140 into a complementary binary state.

Figure 2C:
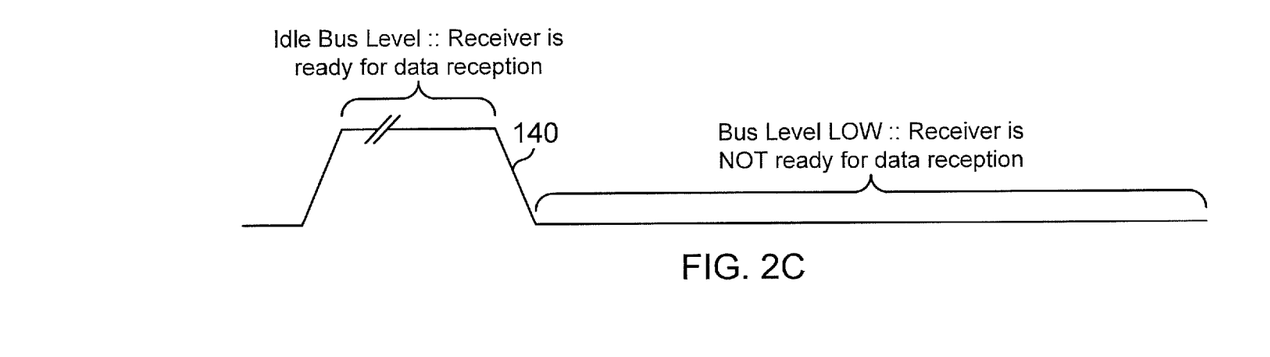
FIG. 2C is a timing diagram for the bus of FIG. 2A including a period in which a receiver is not ready for transmission.

It will be appreciated that the flow control is inherent on bus 140 since transmitter 110 can only send a bit if receiver 115 transitions bus 140 into the complement binary state from its binary state used to trigger the transmission of the previous bit. If bus 140 had been cycled low by a previous falling edge of fetch clock 205, receiver 115 signals it is ready to receive the next bit by cycling bus 140 high to form a rising edge for fetch clock 205. Conversely, if bus 140 had been cycled high by a preceding rising edge for fetch clock 205, receiver 115 signals it is ready to receive the subsequent bit by cycling bus 140 low to form a falling edge for fetch clock 205. Note that the transmission is "baud-rate independent." For example, if receiver 115 is busy and unable to process the subsequent bit in a frame, it may simply delay until it is ready before toggling bus 140 into its complementary state. Such delay is no problem for transmitter 110 as it only transmits each subsequent bit in the frame responsive to the toggling of bus 140 into its complementary state by receiver 115. In addition to the variable delay that may occur between bits to allow receiver 115 sufficient processing time, receiver 115 can also prevent transmitter 110 from even transmitting initial flag 200 by pulling bus 140 low to ground as shown in FIG. 2C. So long as receiver 115 keeps bus 140 discharged in this fashion, it signals to transmitter 110 that it is not ready for a frame. Transmitter 110 thus cannot begin a frame transmission using initial flag 200 while receiver 115 keeps bus 140 grounded. When receiver 115 is ready to receive a frame, it returns bus 140 to its default (idle) high state.

Figure 3:
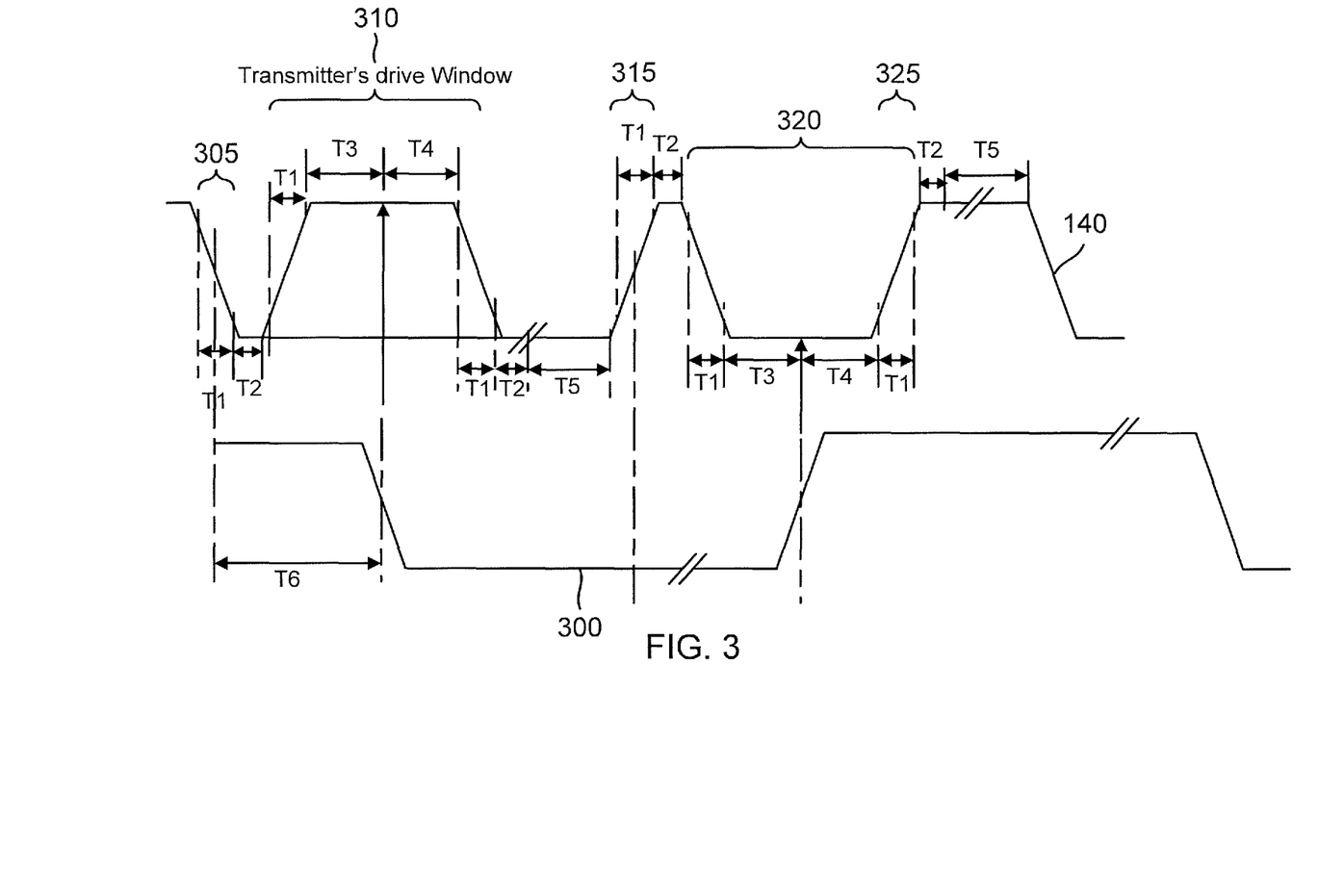
FIG. 3 is a more detailed timing diagram for the bus of FIG. 2B and the corresponding delayed version of the fetch clock in a receiver.

The reception of data at receiver 115 with regard to a set of rising and falling edges 305, 315, and 325 for the fetch clock may be better understood with reference to FIG. 3. To sample the received bits from transmitter 110, receiver 115 may generate a sampling clock 300 that is a delayed version of the binary state for bus 140. Receiver 115 may delay sampling clock 300 with respect to the corresponding rising and falling edges of bus 140 by a time delay T6. Each rising or falling edge for the fetch clock requires a time T1 to complete (the time T1 required for a discharge to ground from the power supply voltage VDD for bus 140 or for a charge from ground to the power supply voltage VDD), followed by a settling time T2 to allow the voltage for bus 140 to settle after each fetch clock transition 305. A transmitter drive window follows each fetch clock transition (time T1) and settling time T2 combination. In each transmitter drive window, transmitter 110 transmits the corresponding data bit by either charging bus 140 high (to transmit a binary one) or by discharging bus 140 low (to transmit a binary zero). Upon completion of each transmitter drive window, transmitter 110 returns bus 140 to whatever binary state it was in resulting from the previous fetch clock transition 305.

In FIG. 3, an initial fetch clock transition 305 pulled bus 140 low (a falling edge for the fetch clock). Transmitter 110 then transmits the corresponding data bit in an initial drive window 310. Thus, if initial drive window 310 were used to transmit a binary zero, transmitter 110 may simply leave bus 140 discharged following initial fetch clock transition 305. In FIG. 3, transmitter 110 uses initial drive window 310 to transmit a binary one so bus 140 was transitioned high to the power supply voltage VDD during initial drive window 310. This bus transition in initial drive window 310 (analogous to initial fetch clock transition 305) requires a rise time T1. Receiver 115 then samples the binary state for bus 140 in initial drive window responsive to a falling edge for sampling clock 300 since initial fetch clock transition 305 was also a falling edge. Following initial drive window 310, transmitter 310 returns bus 140 to its ground state as established by initial fetch clock transition 305 of the fetch clock. This transition takes a fall time T1 followed by another settling time T2. A variable cycle stretch time T5 may then expire. The duration of cycles stretch time T5 depends upon when receiver 115 is ready to receive another bit.

When receive 115 is ready to receive another bit, it triggers a first rising edge 315 for the fetch clock. Rising edge 315 requires a rise time T1 to complete followed by another settling time T2, whereupon transmitter 110 may transmit in a second drive window 320. In this example, transmitter 110 transmits a binary zero in second drive window 320 so that transmitter 110 discharges bus 140 to ground during second drive window 320. Receiver 115 then samples this binary zero state for bus 140 according to a rising edge for sampling clock 300. In each sampling window 310 and 320, the sampling time delay T6 for receiver 115 should be timed so that there is a sufficient setup time T3 and a sufficient hold time T4.

The cycle time for bus 140 (e.g, the time from first fetch clock transition 305 to second fetch clock transition 315) equals $2*(T1+T2+T1+T3+T4+T1+T2+T5)=6T1+4T2+2*(T3+T4+T5)$. Since one bit is transmitted responsive to each fetch clock transition, the data rate is thus $1/(3T1+2T2+T3+T4+T5)$. The resulting data transmission speed depends on the variables T1 through T5. A very conservative estimate for the bus rise and fall time T1 is 1 ns. Similarly, a very conservative estimate for a bus setting time T2 is 1 ns. If one assumes that the bus setup time T3 and bus setup time T4 are both 2 ns and the cycle stretch time T5 is 5 ns, the data transmission rate becomes 71.4 Mbps. Note that such a data rate involved fairly conservative estimates for the bus settling and rise times. Accordingly, considerably faster data rates may be realized in practice. Moreover, such settling times may be measured in the tens of picoseconds or less if two-wire bus 135 comprised interconnects in an integrated circuit package (or conductors entirely within a single integrated circuit).

Figure 4:
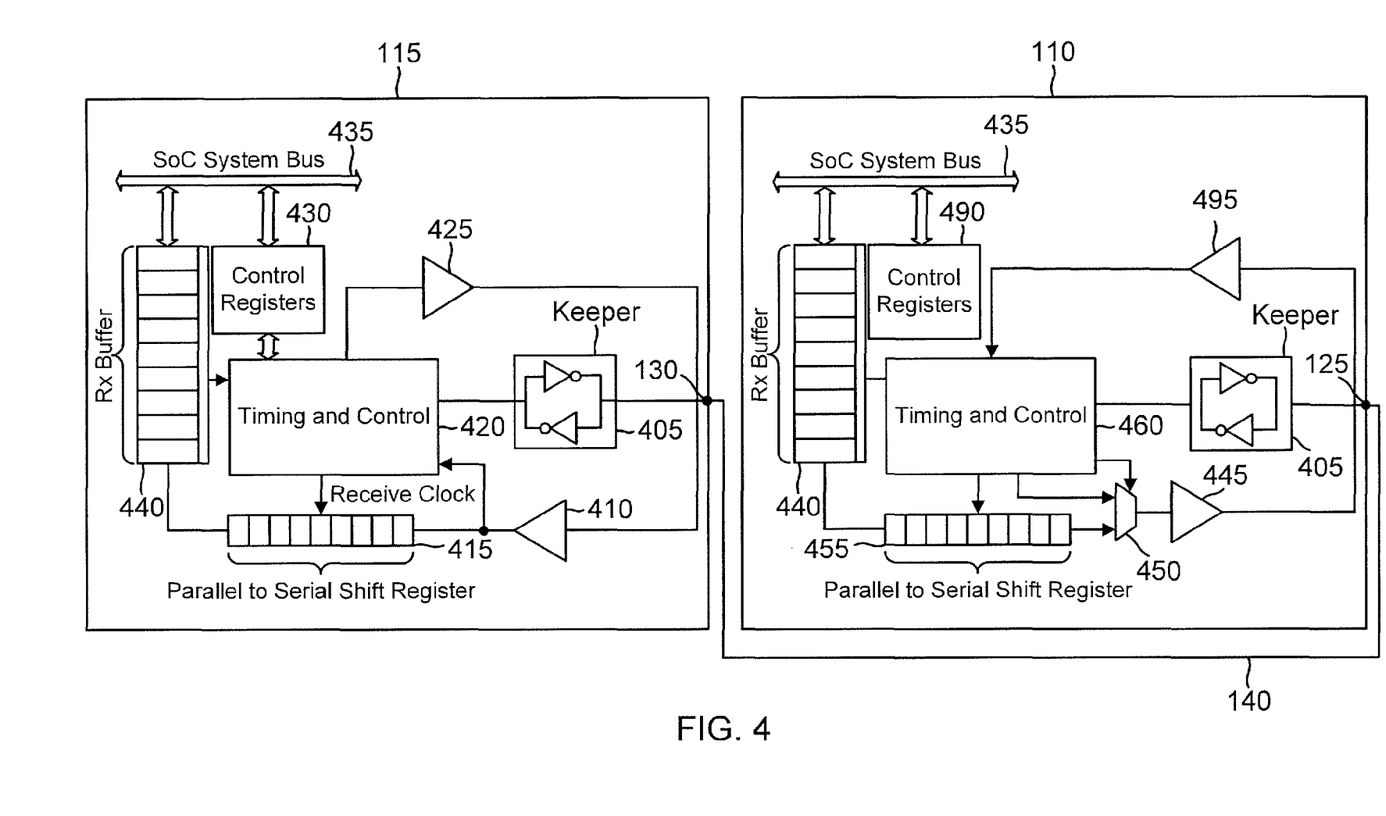
FIG. 4 is a more detailed block diagram for a transmitter and receiver in a dual-data-rate interface in accordance with an aspects of the disclosure.

An example transmitter 110 and receiver 115 is shown in FIG. 4. With regard to transmitter 110, a system bus 435 supplies a data frame to be transmitted, which may initially be stored in a receiver buffer 440. From receiver buffer 440, the data frame is serially shifted into a parallel-to-serial shift register 455 under the control of a timing and control circuit 460. Timing and control circuit 460 monitors the state of bus 140 as determined by fetch clock transitions 305 (FIG. 3) from receiver 115 as received on an input buffer 495. After each fetch clock transition, a keeper circuit such as a latch 405 in transmitter 110 stores the state (high or low) of bus 140. Responsive to each fetch clock transition, timing and control circuit 460 shifts out each successive bit in the frame from shift register 455 through a multiplexer 450 to an output buffer 445 that drives the successive bits onto bus 140 to receiver 115. Upon completion of the drive window 310 (FIG. 3), timing and control circuit 460 returns bus 140 to the state determined by the previous fetch clock transition as stored in latch 405. Multiplexer 450 selects for this retained binary state as controlled by timing and control circuit 460 so that output buffer 445 may drive bus 140 to this previous binary state. Once bus 140 is returned to its previous binary state, output buffer 445 allows bus 140 to float so that it will not fight with any subsequent fetch clock transition. Latch 405 in transmitter 110 may be configured to weakly retain the bus state once output buffer 445 floats bus 140. Control registers 490 coupled to system bus 435 may be configured to store configuration parameters for timing and control circuit 460. Transmit pin 125 (T1) is bi-directional so that transmitter 110 may receive the fetch clock transitions. In that regard, transmitter 110 includes an input buffer 495 that drives the fetch clock transitions to timing and control circuit 460.

Receive pin 130 for receiver 115 is also bi-directional so that receiver 115 may drive the fetch clock transitions to transmitter 110 over bus 140. A latch 405 in receiver 115 retains the binary voltage state for bus 140 so that a timing and control circuit 420 may reverse the binary voltage state for bus 140 by driving it through an output buffer 425 so as to drive a fetch clock edge to transmitter 110. After waiting an appropriate amount of time as discussed with regard to FIG. 3, timing and control circuit 420 shifts in a binary voltage state for bus 140 as received through an input buffer 410 into a parallel-to-serial shift register 415. After a complete frame (or frames) is thus shifted in bit-by-bit into shift register 415, the resulting complete frame may be shifted in parallel into a receive (RX) buffer 440. Receive buffer 440 may then present the received frame to system bus 435 so that it may be received by a processor (not illustrated) or other receive engine in the integrated circuit (not illustrated) incorporating receiver 115. The processor may configure timing and control circuit 420 through a corresponding set of control registers 430. Referring again to FIG. 2B, a frame may include a parity bit (PB) following the agreed-upon number of data bits that constitute a frame. The frame concludes with a stop bit (SB) that is indistinguishable from the default bus state. In other words, once transmitter 110 transmits the parity bit (PB), it drives bus 140 back to its default high voltage state.

To provide an ability to vary the frame size as necessary, each frame may include a header (not illustrated) that may comprise, for example, two function bits (fn_bit_0) and (fn_bit_1). If the transmitter wants to change the frame size, it does so by signaling through the header. For example, in a two-function-bit embodiment for the header, the transmitter may assert fn_bit_0 and de-assert fn_bit_1 to indicate that the following frame encodes for the frame size. Conversely, if the frame size is to remain unchanged, the transmitter may de-assert fn_bit_0 and assert fn_bit_1.

The messaging discussed herein is independent of the type of data being communicated. In one embodiment, however, the data may be virtual GPIO states. In other words, rather than transmitting a GPIO signal over its corresponding GPIO pin, the signal becomes a "virtual GPIO signal" that is transmitted in the frames discussed herein over transmit pin 125 and receive pin 130. For example, the virtual GPIO protocol for varying frame length as disclosed in co-assigned U.S. patent application Ser. No. 14/850,809, filed Sep. 10, 2015 may be readily adapted to use the dual-data-rate protocol discussed herein. U.S. patent application Ser. No. 14/850,809 is thus incorporated by reference herein in its entirety.

Timing and control circuits 420 and 460 may each be implemented using software, firmware, or hardware. For example, in a hardware implementation, timing and control circuits 420 and 460 may each comprise a finite state machine. In alternative implementations, timing and control circuit 460 may be deemed to comprise a means for shifting out successive bits of a data frame responsive to receiving successive ones of a series of fetch clock transitions over transmit pin 125 and for restoring a binary voltage state for transmit pin 125 after each successive bit transmission responsive to the binary state for a preceding fetch clock transition retrieved from latch 405.

Figure 5:
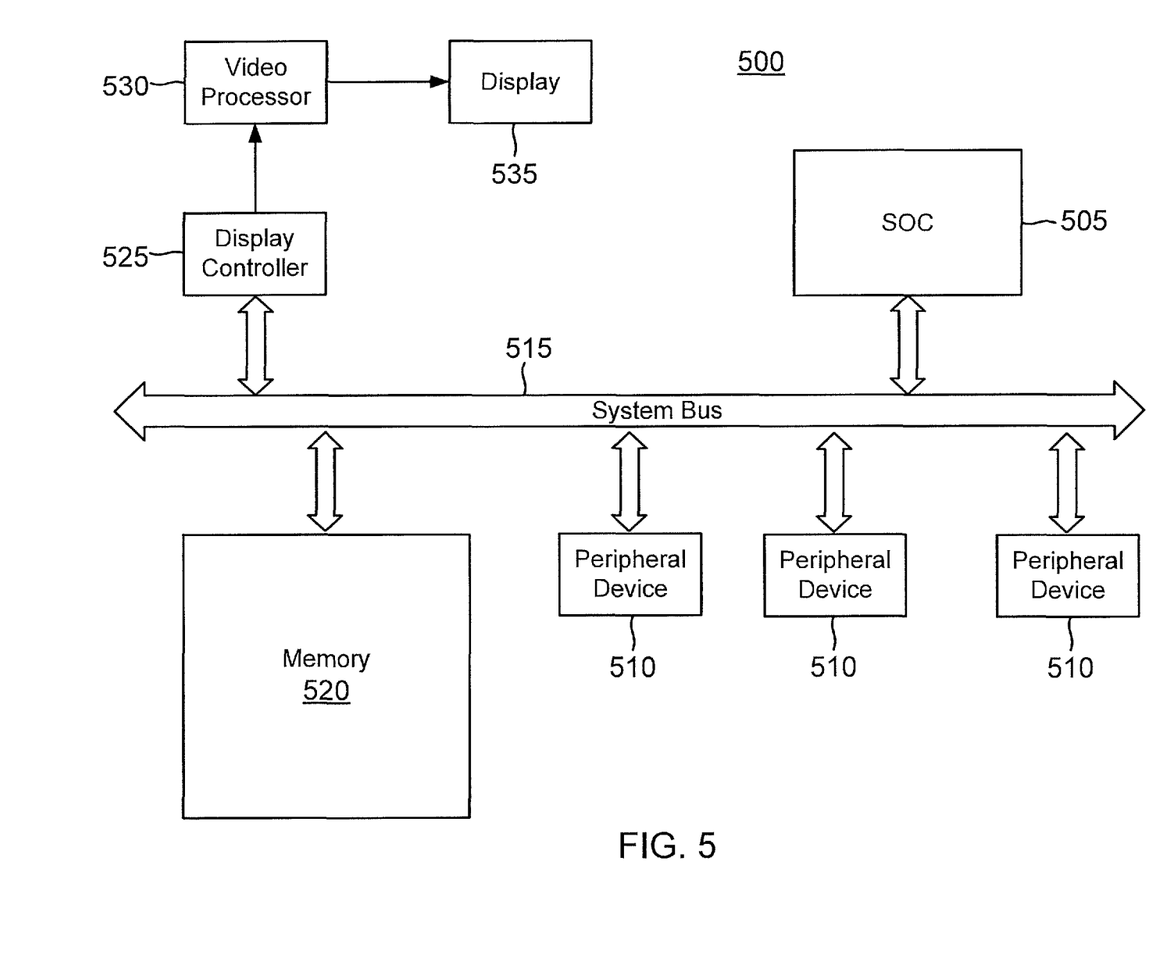
FIG. 5 is a diagram of a system including integrated circuits having a dual-data-rate interface in accordance with an aspect of the disclosure.

An example system 500 is shown in FIG. 5 in which an SOC 505 is configured to communicate over a dual-data-rate interface (not illustrated) as disclosed herein with a plurality of peripheral devices 510. Each peripheral device 510 thus also includes a dual-data-rate interface (not illustrated) as disclosed herein. The corresponding two-wire link 135 (FIG. 1) between SOC 505 and each peripheral device 510 is also not shown for illustration clarity. System 500 may comprise a cellular phone, smart phone, personal digital assistant, tablet computer, laptop computer, digital camera, handheld gaming device, or other suitable device. In addition to using its dual-data-rate interface, SoC 505 communicates with peripheral devices 510 such as sensors over a system bus 515 that also couples to a memory such as a DRAM 520 and to a display controller 525. Display controller 525 in turn couples to a video processor 530 that drives a display 535.

Figure 6:
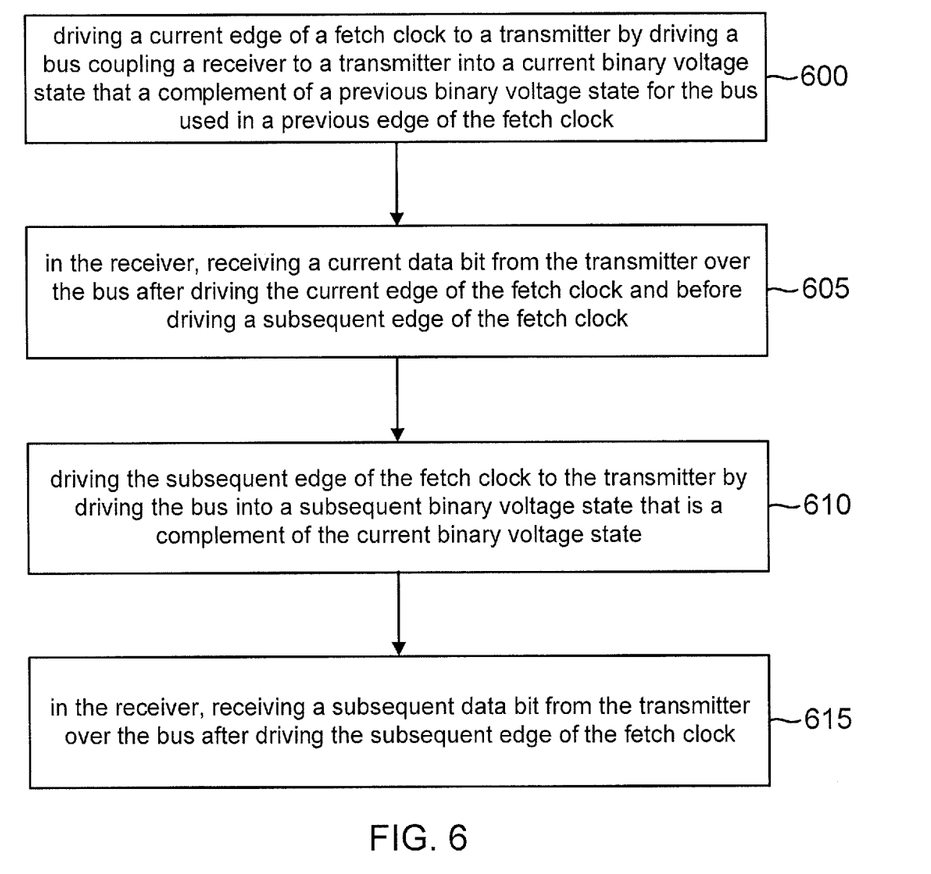
FIG. 6 is a flowchart for a method of operation for a receiver in a dual-data-rate interface in accordance with an aspect of the disclosure.

A method of operation for receiver 115 will now be discussed with regard to the flowchart of FIG. 6. The method includes an act 600 of driving a current edge of a fetch clock to a transmitter by driving a bus coupling a receiver to the transmitter into a current binary voltage state that is a complement of a previous binary voltage state for a previous edge of the fetch clock. An example of act 600 is discussed above with regard to rising edge 215 of the fetch clock shown in FIG. 2B. Since the previous fetch clock transition was a falling edge 210, receiver 115 generates rising edge 215 to trigger transmitter 110 to transmit the current bit (in this example, D1) of the frame.

The method also includes an act 605 of receiving a current data bit from the transmitter over the bus after driving the current edge of the fetch clock and before driving a subsequent edge of the fetch clock. The sampling of the transmitted zero from transmitter 110 in receiver 115 during second drive window 320 discussed above is an example of act 605. In addition, the method includes an act 610 of driving the subsequent edge of the fetch clock to the transmitter by driving the bus into a subsequent binary voltage state that is a complement of the current binary voltage state. The transmission of the falling edge for the fetch clock following bit D1 of FIG. 2B is an example of act 610.

Finally, the method includes an act 615 of receiving a subsequent data bit from the transmitter over the bus after driving the subsequent edge of the fetch clock. The receipt of bit D2 at receiver 115 following the falling edge for the fetch clock after transmission of bit D1 as shown in FIG. 2B is an example of act 620.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A dual-data-rate interface for an integrated circuit, comprising:
    a transmit pin;
    a first memory configured to store first fetch clock transitions received on the transmit pin, wherein the first fetch clock transitions correspond to a plurality of first data bits in a first frame, and wherein the first memory is further configured to store each first fetch clock transition as a binary state; and
    a first timing and control circuit configured to charge the transmit pin to a power supply voltage during a default state prior to a transmission of the first frame and to discharge the transmit pin and then charge the transmit pin back to the power supply voltage for a flag period to begin the transmission of the first frame, wherein an initial one of the first fetch clock transitions discharges the transmit pin and each successive first fetch clock transitions is a complement of a preceding first fetch clock transition, and wherein the first timing and control circuit is further configured to drive each first data bit of the first frame over the transmit pin responsive to a receipt on the transmit pin of the corresponding first fetch clock transition, wherein the first timing and control circuit is further configured to restore a voltage for the transmit pin responsive to the binary state stored in the memory for the corresponding first fetch clock transition.

2. The dual-data-rate interface of claim 1, further comprising:
    a first input buffer coupled to the transmit pin, wherein the first input buffer is configured to drive each first fetch clock transition received on the transmit pin to the first timing and control circuit.

3. The dual-data-rate interface of claim 1, further comprising:
    a first shift register configured to store the plurality of first data bits, and wherein the first timing and control circuit is further configured shift out each first data bit from the first shift register responsive to the receipt on the transmit pin of the corresponding first fetch clock transition.

4. The dual-data-rate interface of claim 1, wherein the first memory comprises a latch.

5. The dual-data-rate interface of claim 1, further comprising a multiplexer configured to select between the binary state stored in the first memory and each first data bit.

6. The dual-data-rate interface of claim 5, further comprising a first output buffer configured to drive the transmit pin with an output signal from the multiplexer.

7. The dual-data-rate interface of claim 1, further comprising:
    a receive pin;
    a second memory configured to store second fetch clock transitions transmitted over the transmit pin, wherein the second memory is further configured to store each second fetch clock transition as a binary state; and a second timing and control module, wherein the second timing and control module is configured to transmit the second fetch clock transitions in a series, and wherein the second timing and control module is further configured to transmit each second fetch clock transition in the series over the receive pin responsive to a determination that the dual-data-rate interface is ready to receive a second data bit in a data frame over the receive pin; and wherein the second timing and control module is further configured to drive each second fetch clock transition in the series to a binary value that is a complement of the binary state stored in the second memory for a preceding one of the second fetch clock transitions in the series.

8. The dual-data-rate interface of claim 7, wherein the second timing and control module is further configured to sample each second data bit received over the receive pin and to load the sampled second data bit into a second shift register.

9. The dual-data-rate interface of claim 7, wherein the second memory comprises a latch.

10. The dual-data-rate interface of claim 7, wherein the dual-data-rate interface is included in a system-on-chip (SoC).

11. The dual-data-rate interface of claim 10, wherein the SoC is included in a system selected from the group consisting of a cellular phone, a smart phone, a personal digital assistant, a tablet computer, a laptop computer, a digital camera, and a handheld gaming device.

12. A method of communication, comprising:
driving a first edge of a fetch clock to a transmitter by discharging a bus coupling a receiver to a transmitter;
responsive to the driving of the first edge of the fetch clock, receiving a first bit over the bus at the receiver, wherein the bus is discharged upon a conclusion of a receipt of the first bit;
driving a second edge of the fetch clock to the transmitter from the receiver by charging the bus to a power supply voltage; and
responsive to the driving of the second edge of the fetch clock, receiving a second bit at the receiver over the bus from the transmitter, wherein the bus is charged to the power supply voltage upon a conclusion of a receipt of the second bit.

13. The method of claim 12, wherein driving the first edge of the fetch comprises discharging a receive pin on the receiver coupled to a transmit pin on the transmitter.

14. The method of claim 13, wherein driving the second edge of the fetch clock comprises charging the receive pin to the power supply voltage.

15. The method of claim 13, wherein driving the third edge of the fetch clock comprises discharging the receive pin.

16. A method of communication, comprising:
at a transmitter having a transmit pin coupled to a receive pin of a receiver, detecting a first edge of a fetch clock from the receiver by detecting that the transmit pin has been discharged;
responsive to the detection of the first edge of the fetch clock, transmitting a first bit over the transmit pin to the receive pin of the receiver and discharging the transmit pin after a completion of the transmission of the first bit;
detecting a second edge of the fetch clock by detecting that the transmit pin has been charged to a power supply voltage; and
responsive to the detection of the second edge of the fetch clock, transmitting a second bit over the transmit pin to the receive pin of the receiver and charging the transmit pin back to the power supply voltage.

17. The method of claim 16, wherein the first bit and the second bit are part of a frame.

18. The method of claim 17, further comprising discharging the transmit pin prior to transmitting the frame.

19. An integrated circuit, comprising:
a transmit pin;
a memory configured to store fetch clock transitions received on the transmit pin, wherein the fetch clock transitions correspond to a plurality of data bits, and wherein the memory is further configured to store each fetch clock transition as a binary state; and
means for shifting out successive bits of a data frame responsive to receiving successive ones of the fetch clock transitions over the transmit pin and for restoring a binary voltage state for the transmit pin after each successive bit transmission responsive to the binary state for a preceding fetch clock transition retrieved from the memory, wherein each preceding fetch clock transition is a binary complement of each successive fetch clock transition.

20. The integrated circuit of claim 19, wherein the memory comprises a latch.

21. The integrated circuit of claim 19, further comprising a shift register configured to store the plurality of data bits, and wherein the means is further configured shift out each first data bit from the first shift register responsive to the receipt on the transmit pin of a corresponding fetch clock transition.

22. The integrated circuit of claim 21, wherein the integrated circuit is included in a system selected from the group consisting of a cellular phone, a smart phone, a personal digital assistant, a tablet computer, a laptop computer, a digital camera, and a handheld gaming device.

* * * * *